Patented Aug. 25, 1931

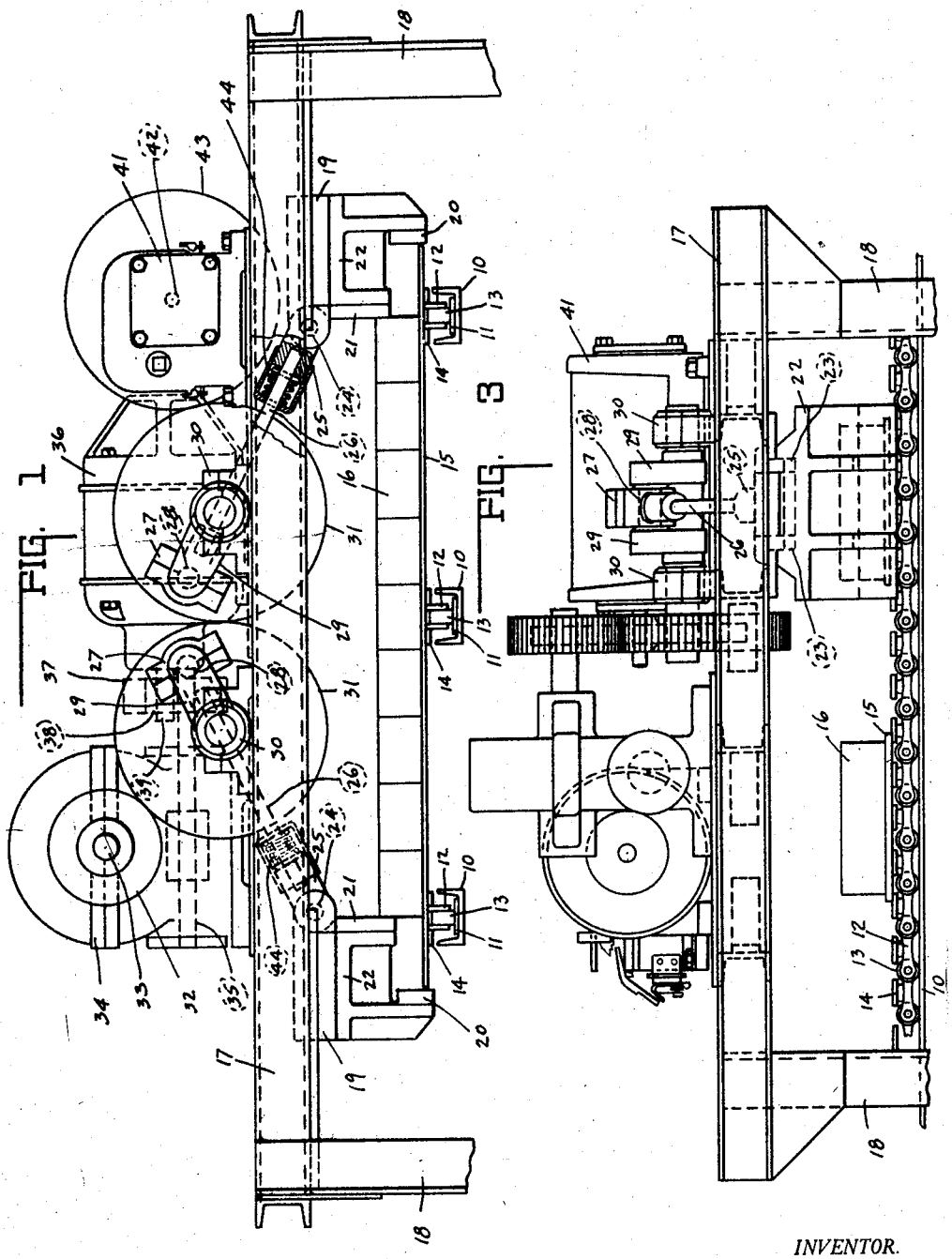

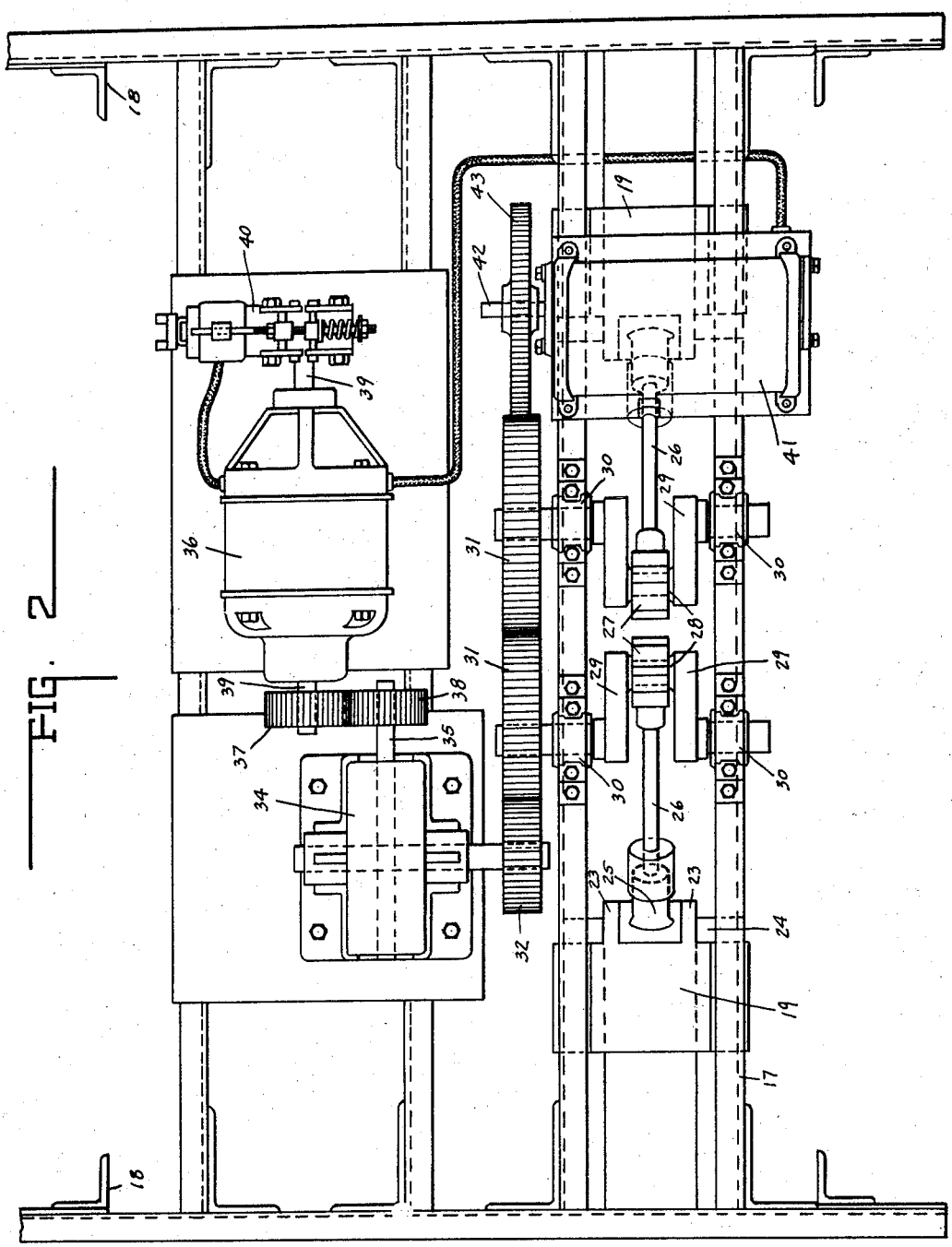

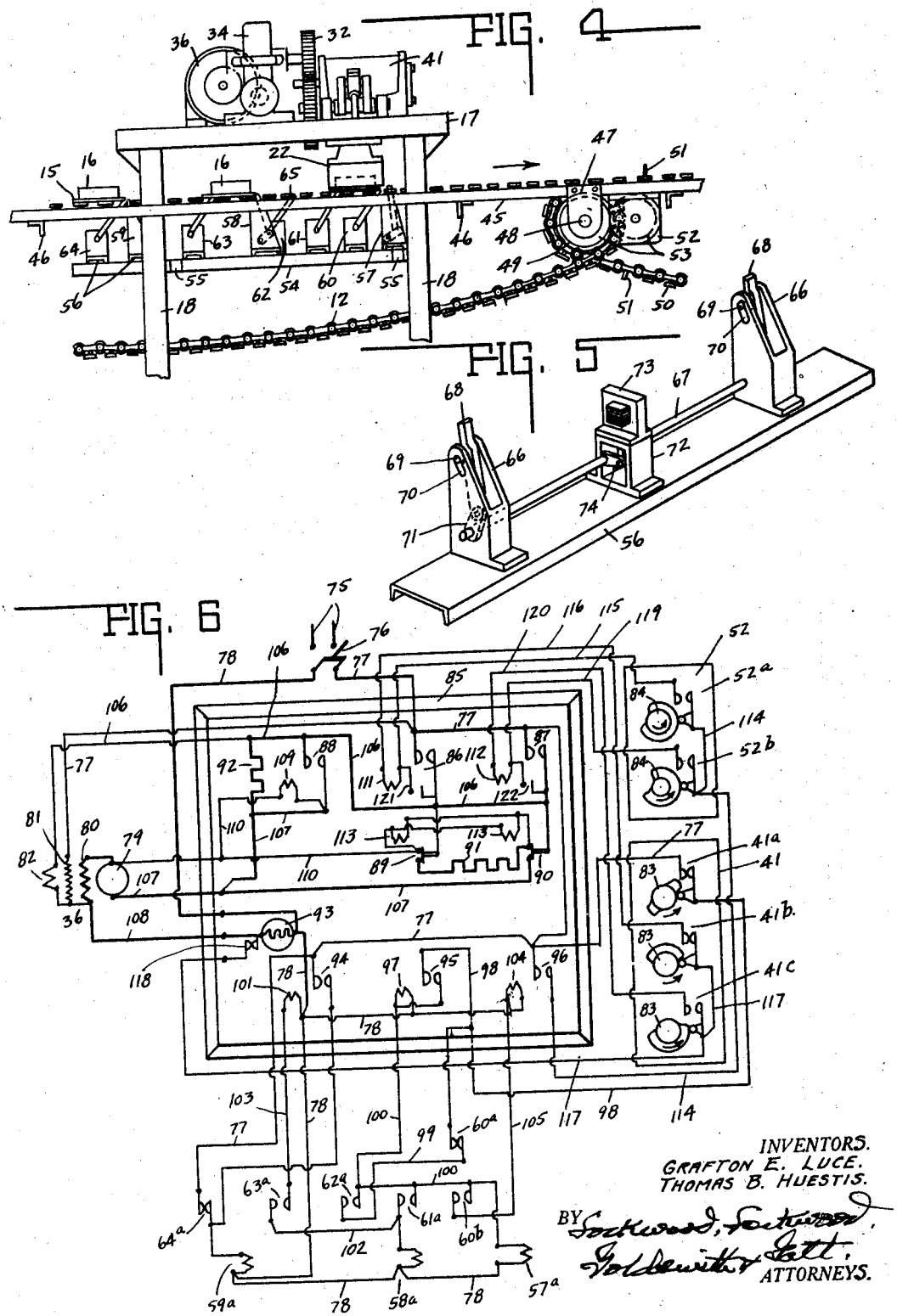

1,820,471

UNITED STATES PATENT OFFICE

GRAFTON E. LUCE, OF CHICAGO, ILLINOIS, AND THOMAS B. HUESTIS, OF GREEN-CASTLE, INDIANA, ASSIGNORS TO LANCASTER IRON WORKS, INC., OF LANCASTER, PENNSYLVANIA, A CORPORATION

BRICK AND PALLET CENTERING DEVICE

Application filed May 24, 1929. Serial No. 365,743.

This invention relates to a brick handling device adapted to center a pallet with respect to its conveyor and center the brick relative to the pallet upon which they are carried and to control the travel of the pallet upon the conveyor in timed relation with other apparatus in a system of automatically handling brick. This is a continuation in part of application Serial No. 265,439, filed March 28, 1928.

This mechanism is one of several units employed in a brick handling system wherein the brick are carried upon pallets by a conveyor ultimately to a hacking machine. At the beginning of the conveying operation, the pallets may be supported by the conveyor in varying positions, and the brick will lie on the pallets in uneven positions. In order to bring the pallets and the brick carried thereby into such relative position as to permit them to be automatically operated upon, it is necessary to center the pallets with respect to the conveyor, or in other words place them in a predetermined position thereon, and cause the brick to be likewise centered in a predetermined position on the pallet.

The machine next to operate upon the brick and pallets is an edging machine, one form of which is disclosed in Patent No. 1,746,664, issued to Grafton E. Luce February 11, 1930, and another form of which is disclosed in co-pending application Serial No. 400,835, filed October 19, 1929. It is necessary for the operation of the edging machine that the pallets reach the same in timed relation with the movement of its parts. The release of pallets from the device herein described is, therefore, timed with the operation of said edging machine.

The chief object of this invention is to provide such a centering device as will not only center a pallet with respect to the conveyor and the line of travel thereof, but will simultaneously center the brick supported thereby in a predetermined position upon the pallet.

Another object of the invention is to provide apparatus for stopping the pallets upon the conveyor, centering them and releasing them for further travel in the shortest possible time and in timed relation with another device next to operate on said pallets.

The full nature of the invention will be understood from the accompanying drawings and the following description and claims:

In the drawings Fig. 1 is a side elevational view of the centering device with the jaws thereof in centering position. Fig. 2 is a top plan view of the centering device. Fig. 3 is an end elevational view of the device. Fig. 4 is an elevational view of the centering mechanism showing the pallet stop apparatus and electrical switches for controlling the same and showing the conveyor leading to the next operating machine. Fig. 5 is a detail perspective view of the pallet stop elements. Fig. 6 is a wiring diagram of the electrical connections.

In the drawings 10 indicates a plurality of channels arranged in spaced relation and each supporting a trackway 11 in turn supporting a link belt chain conveyor 12 provided with rollers 13 engaging said trackway, and provided with lateral bracket or pallet-supporting plates 14. The pallet is indicated by the numeral 15 and the brick by the numeral 16.

Straddling the conveyor system there is a frame support 17 supported by the upright columns 18. Said frame 17 embodies flanged angle bars slidably supporting and confining the cross heads 19, said cross heads being movable toward and away from each other. Each cross head supports multiple aligning or clamping jaws, the pallet-engaging jaw being indicated by the number 20, the brick-engaging jaw by the numeral 21 and the connecting portion being indicated by the numeral 22. Each cross head is provided with the ears 23 between which is pivotally mounted a wrist pin 24 which mounts the head 25 of the connecting rod 26, the opposite end terminating in a bearing 27 supported by a crank shaft 28 between the cheeks 29 thereof. The crank shaft 28 is rotatably supported in the bearings 30 carried by the frame 17.

From the drawings it will be noted that the jaw, cross head, connecting rod and crank shaft construction is duplicated in reverse relation and each crank shaft supports a gear 31, which gears mesh with each other and, therefore, have reverse rotation. The mechanism for rotating the crank shaft includes a pinion 32 supported by a shaft 33 of a gear reduction transmission 34 driven by the shaft 35. The motor 36 mounts a driving pinion 37 meshing with a similar pinion 38 on shaft 35. Associated with the shaft 39 of the motor 36, there is a solenoid-actuated brake indicated by the numeral 40. Said brake is operated to stop frictionally the motor immediately upon the current being cut off, which actuates the solenoid in the usual manner. Connected with the motor by suitable electric cables, there is a control switch indicated by the numeral 41 which has an operating shaft 42 carrying a gear 43 that meshes with one of the mating gears 31 so that the switch is operated in timed relation with the movement of the centering jaws for controlling the current to the motor as will be hereinafter described.

If desired, a spring bumper 44 may be interposed between the end of the connecting rod 26 and the head 25. The spring bumper is adapted to take up any shock caused by inequality in the pallet or the brick and acts as an absorbing medium for avoiding breakage.

In the operation of the device a pallet is stopped in position between jaws 20 and 21 by means of pallet stop devices to be hereinafter described. The motor is then automatically actuated to move the jaws inward to the centering position as illustrated in Fig. 1. Continued rotation of the motor carries the jaws outwardly from each other leaving the pallet centered upon the conveyor and the brick centered upon the pallet. The motor is automatically stopped when the jaws reach extreme outward position. At a predetermined point in the outward travel of the jaws the pallet stop device is automatically actuated to release the pallet for further movement on the conveyor.

Referring particularly to Fig. 4, longitudinal frame members 45 are supported on the upright frame members 18 on each side of the conveyor. The members 45 in turn support cross members 46 supporting the channel members 10 previously described. A bearing member 47 on each of the frame members 45 carries a shaft 48 in turn carrying sprockets 49 herein five in number. Three of the sprockets 49 are associated with the conveyor chains 12 hereinbefore described and the other two are placed adjacent to the outer pair of chains 12 and associated with conveyor chains 50 leading to the next operating machine. The sprockets 49 are all of the same size and are keyed to shaft 48 so that the travels of chains 12 and 50 are maintained at the same speed. The chains 50 carry attachments 51. For the operation of the next operating machine, it is necessary that pallets be released from the centering device at the proper time to reach chains 50 from one to three inches ahead of attachments 51.

Supported on one of the members 45 is an electric switch 52 connected by a pair of gears 53 with the shaft 48. The switch 52 is, therefore, driven in timed relation with the conveyor chains and is used as will hereinafter be described to control the operation of motor 36 and the pallet-releasing means.

A pair of longitudinal frame members 54 are supported by clip angles 55 upon the upright members 18 and in turn support a plurality of transverse channel members 56. The transverse channel members support pallet stop units 57, 58 and 59 and electric switch boxes 60, 61, 62, 63 and 64. Each of the said switch boxes has an arm 65 extending upwardly into the path of travel of the pallets and adapted to be operated by said pallets to open or close circuits in the switch boxes.

Each of the pallet stop units comprise a pair of frames 66 pivotally carrying a shaft 67. Associated with each of the frames 66 is a stop lever 68 having a pin 69 engaging a slotted hole 70 in the said frame and having its lower end pivotally connected to a link 71 fixedly mounted upon the shaft 67. By this construction rotation of the shaft 67 causes raising of the stop lever 68 into the path of travel of the pallet and return rotation thereof causes dropping of said lever to allow travel of the pallet. Each of the frames 66 is positioned adjacent to one of the outside conveyor chains 12. Intermediate of the said frames is a solenoid frame 72 supporting a solenoid 73. The plunger of the said solenoid is pivotally connected to a lever 74 fixedly carried upon the shaft 67. The energizing of the solenoid 73 thereby rotates shaft 67 to place the lever 68 in position to stop a pallet and the deenergizing of said solenoid allows the said levers to drop by gravity out of the path of the pallet. The slotted holes 69 are placed at an angle as shown in Fig. 5 and thereby allow the lever 68 to drop diagonally away from the pallet rather than dropping in a truly vertical direction. This allows a free release of the pallet which could not otherwise be obtained.

Referring particularly to the wiring diagram, Fig. 6, a pair of electric supply lines 75 are connected to a suitable source of electric potential and to a double pole knife switch 76. A common supply line leads from one terminal of the double pole knife switch to several of the electrical units and is indicated by the numeral 77 in all of its branches. A common return line leads from several of the electrical units to the opposite terminal of the knife switch 76 and is indicated by the numeral 78 throughout all of its branches.

The motor 36 is herein shown as a direct current motor having armature 79, series field coils 80, shunt field coils 81 and brake solenoid 82. The switch 41 is illustrated diagrammatically as having three contacts 41$^a$, 41$^b$ and 41$^c$, each controlled by one of a series of cams 83 to open and close its circuit in timed relation with the travel of the centering jaws. The switch 52 is represented diagrammatically as containing two pairs of contact members 52$^a$ and 52$^b$, each controlled by one of cams 84 to open or close its circuit in timed relation with the travel of the conveyor chains 50 and 12. The numerals 60$^a$ and 60$^b$ indicate respectively a normally closed and a normally opened pair of contact points contained in the switch box 60. The numerals 61$^a$, 62$^a$ and 63$^a$ indicate pairs of electrical contacts normally opened and contained in the switch boxes 61, 62 and 63 respectively. The numeral 64$^a$ indicates a normally closed pair of contacts carried in the switch box 64. A control panel 85 carries magnetic motor starting contactors 86 and 87, accelerating contactor 88, normally closed dynamic brake contactors 89 and 90, dynamic brake resister 91, accelerating resister 92, thermal overload relay 93 and magnetic control contactors 94, 95 and 96. The numerals 57$^a$, 58$^a$ and 59$^a$ indicate the solenoids for actuating the pallet stop units 57, 58 and 59 respectively.

In the operation of the device assume an initial relation of parts in which the centering jaws are in their farthest open position, the conveyor chains are in operation and all of the electrical apparatus is in the normal positions indicated in Fig. 6. In this relation the solenoid 59$^a$ is energized by a circuit 75—76—77—64$^a$—59$^a$—78—76—75. Thus the pallet stop unit 59 will be in position to stop a pallet. The first pallet to approach the device may be disposed upon the conveyor with its axis at an angle other than a right angle to the line of travel of the conveyor. In that case, one end of the pallet will strike one of the stop levers 68 before the other. The first end to strike will be held in place until the other end has come in contact with its stop lever 68 bringing the pallet square with the conveyor. The arm of the switch box 64 is positioned approximately half way between the levers 68 and substantially in line therewith. The edge of the pallet will, therefore, strike the arm at the instant of contact with both stop members 68. The actuation of switch 64 then opens the contact 64$^a$ allowing deenergization of the solenoid 59$^a$ and passage of the pallet along the conveyor in squared relation.

In passing into the device the pallet actuates in turn the levers for the switch boxes 63, 62, 61 and 60. The first of these contacts, 63$^a$, is dependent upon the contact 61$^a$ as shown in the diagram and, therefore, no action results unless the said contacts are simultaneously actuated. The actuation of contact 62$^a$ energizes the solenoid 57$^a$ to place the pallet stop unit 57 in condition to stop the pallet in position for centering. The circuit for this actuation is as follows: 75—76—77—41$^a$—line 98—60$^a$—line 99—62$^a$—line 100—57$^a$—78—76—75. The actuation of contact 62$^a$ also actuates a solenoid 97 adapted to close the contact 95 by a circuit as follows: 75—76—77—41$^a$—98—60$^a$—99—62$^a$—100—97—78—76—75. The contact 95 short circuits both the 60$^a$ and 62$^a$ contacts and thereby maintains the circuit for the energizing of solenoid 57$^a$ to hold the pallet in centering position, even after the breaking of either or both contacts 60$^a$ and 62$^a$. The above circuit can not be broken to release a pallet until contact 41$^a$ is broken at a predetermined time in the travel of the centering jaws after centering is complete.

When the pallet comes to rest between the centering cross heads, it is in position to actuate switch 60$^a$ to open its contact and switches 60$^b$ and 61$^a$ to close their contacts. The energizing of switch 61$^a$ closes a circuit to energize solenoid 58$^a$ to place pallet stop unit 58 in pallet-stopping position, thus holding the next oncoming pallet as long as a pallet occupies the centering position. The circuit for this actuation is as follows: 75—76—77—41$^a$—98—95—100—61$^a$—58$^a$—78—76—75.

If the second pallet enters the device during the centering of the first one, it is stopped by pallet-stopping unit 58 in contact with the lever arm of switch 63, thus closing contact 63$^a$. The closing of this contact when contact 61$^a$ is also closed sets up a circuit to energize a solenoid 101 adapted to close the normally open contact 94. The circuit for this actuation is as follows: 75—76—77—41$^a$—98—95—100—61$^a$—line 102—63$^a$—line 103—101—78—76—75. The closing of contact 94 short circuits the contact 64$^a$, thus maintaining solenoid 59$^a$ in the energizing position and maintaining pallet-stopping unit 59 in position to stop the next oncoming pallet, even after the said pallet is positioned square with the conveyor. Thus provision is made for stopping two oncoming pallets if they arrive during the centering of another pallet. If the supply of pallets is extremely irregular a larger number of pallet-stop units must be provided and must be electrically connected in an analogous manner. If the pallets are carefully placed on the conveyor reasonably square therewith the squaring feature associated with the unit 59 may be omitted.

For the operation of the centering motor 36 duplicate circuits are provided, one of which is associated with the motor-starting contactor 86 and the other with the motor-starting contactor 87, which are used on alternate centering cycles. The two contactors 86 and 87 are connected in parallel and the operation of either will actuate the motor through a circuit as follows: 75—76—77—86 or 87—line 106—start resistance 92—line 107—armature 79—series field 80—line 108—overload relay 93—78—76—75. The shunt field coils 81 are directly connected to lines 77 and 108 and so are always energized. The solenoid brake coil 82 is connected between the lines 106 and 108 and is, therefore, energized at the same time as the motor armature. A solenoid 109 is connected by lines 107 and 110 in parallel with the armature 79 and is adapted to close the acceleration contactor 88, short circuiting the starting resistance 92. This occurs when the speed of the motor has increased to a predetermined value sufficient to generate a counter-electromotive force sufficient to operate the solenoid 109. The contactors 86 and 87 are actuated to start the motor by solenoids 111 and 112 respectively. The contact 86 is mechanically connected to the normally closed contact 89 so that closing of contact 86 opens contact 89. The contact 87 is similarly connected to the normally closed contact 90. By means of the lines 107 and 110 and the contactors 89 and 90, the brake resister 91 is directly connected to the armature of the motor so long as both solenoids 111 and 112 are deenergized. The stopping of the motor, therefore, immediately connects the brake resistance 91 for dynamic braking. Two solenoids 113 are connected in parallel with the resistance 91 and are adapted to maintain contacts 89 and 90 in closed relation as long as the counter-electromotive force of the motor is sufficient for their actuation. This prevents bouncing and arcing of the contacts 89 and 90 upon the application of the dynamic braking. The solenoids 113 are not of sufficient strength to oppose the action of solenoids 111 and 112. By this wiring, therefore, the actuation of either solenoid 111 or 112 will start the motor and will supply current to energize the braking coil 82 to release the solenoid brake. The deenergizing of the same solenoids will stop the motor and instantly apply both the solenoid and dynamic brakes.

The circuits for actuation of solenoids 111 and 112 to operate the motor 36 are associated with the contacts 60$^a$ and 60$^b$ in switch box 60 and with certain contacts in switches 41 and 52. The 60$^b$ contact is used to condition the circuits for starting the motor when a pallet is in centering position. However, the actual start impulse is given by the contacts in switch box 52 which are operated in timed relation with the chain conveyor 50. The time required to operate the centering jaws, release the pallet and allow it to travel from centering position to the conveyor 50 is exactly the same for each pallet. The electrical impulse from switch 52 is therefore made to occur in the proper timed relation to the travel of the attachments 51 to allow each pallet to be centered and released and to reach conveyor 50 from one to three inches ahead of one of the said attachments. The impulse from switch 52 will not be effective to start the motor unless a pallet is in position for centering. Conversely, once a pallet is in position for centering, the motor will not be started until the impulse is received from switch 52. Once a centering cycle has been completed another motor actuation can not be obtained until three events have occurred:

1. The pallet just centered must leave centering position to allow switch 60$^a$ to close.
2. Another pallet must enter centering position operating contacts 62$^a$ and 60$^a$ in turn.
3. Another impulse must be received from switch 52.

The complete circuits for this operation will be hereinafter described in detail.

The contacts 41$^b$ and 41$^c$ in switch 41 are used to stop the motor at the completion of each centering cycle with the jaws in the extreme open position. Contact 41$^b$ is associated with solenoid 111 and contact 41$^c$ is associated with solenoid 112. The switch 41 is geared to make a complete revolution for two complete centering cycles. Each of the contacts 41$^b$ and 41$^c$ is closed during slightly more than half of this revolution. The timing is such that each contact is closed just before the other is opened and the opening of the contacts is timed to occur when the centering jaws are in extreme open position. Thus the opening of one contact stops the motor and leaves the second contact in position for the start of the next cycle.

The motor control circuits will now be traced in detail. When the pallet has reached centering position, contact 62$^a$ has been actuated to energize solenoid 97 and close contactor 95, thus connecting line 100 with the common supply line 77 as previously described. The contact 60$^b$ is then operated by the pallet to energize a solenoid 104 adapted to close the normally open contact 96. The circuit for solenoid 104 is 75—76—77—41$^a$—98—95—100—60$^b$—105—104—78—76—75. The closing of contact 96 supplies power to switch 52 for the motor-starting impulse by means of a line 114. As long as contact 96 is open, switch 52 is inoperative to start the motor. In switch 52, two contacts 52$^a$ and 52$^b$, are operated to close simultaneously at the instant that a starting impulse is desired. The two contacts are opened immediately after closing, thus giving an instantaneous electric impulse to one of the solenoids 111 or 112, depending upon which of the contacts 41$^b$ or 41$^c$ is in contacting position. The circuit for solenoid 111 is 75—76—77—96—line 114—52$^a$—line 115—111—line 116—41$^b$—line 117—a normally closed contactor 118 controlled by the overload relay 93—93—78—76—75. For solenoid 112, the circuit is 75—

76—77—96—114—52$^b$—line 119—112—line 120—41$^c$—117—118—93—78—76—75. The inclusion of contact 118 in each of these circuits insures that the operation of the overload relay will stop the motor whichever circuit is operating. Carried on the contactor 86 is a normally open interlock 121 which short circuits both the contactors 96 and 52$^a$ as soon as switch 86 is closed. Thus the impulse secured from contact 52$^a$ operates the solenoid 111 and thereafter the interlock 121 maintains the said solenoid in actuation even though the contacts 52$^a$ and 96 are thereafter broken. To deenergize solenoid 111 it is necessary to break the contact 41$^b$. The interlock 122 associated with contact 87 and solenoid 112 performs a similar function in that circuit.

When the motor has traveled far enough to bring the centering jaws into centering position and to start them on their return travel, the contact 41$^a$ is broken and instantly allowed to close again. Since this contact is a part of the circuit for solenoid 97 as previously described, this solenoid is thereby deenergized, contact 95 is opened, solenoids 57$^a$, 58$^a$ and 59$^a$ are deenergized and the pallets are free to travel on the conveyor. The solenoid 104 is also dependent upon the contact 95. Therefore, the opening of contact 95 allows the opening of contact 96 and renders switch 52 inoperative.

As previously described, the contacts 60$^a$ and 62$^a$ form a part of the circuit for solenoid 97, therefore, the solenoid can not again be actuated until the pallet just centered has cleared the centering position allowing contact 60$^a$ to close and the next oncoming pallet has operated contact 62$^a$. The closing of contact 41$^a$ immediately after it is opened, therefore, has no other effect than to condition the circuit ready for the arrival of the next pallet.

In the continued travel of the motor after contact 41$^a$ has been instantaneously opened, the contact 41$^c$ will be closed before contact 41$^b$ is open to stop the motor. Since this always occurs after switch 52 has been rendered inoperative by the opening of contact 41$^a$, the closing of this contact can not cause an immediate repetition of the centering cycle.

If desired the switch box 62 and contact 62$^a$ may be omitted. Lines 99 and 100 will then be connected together. In this case solenoids 57$^a$ and 97 are normally energized instead of being energized only after the actuation of switch 62. This results in a slight waste of power but otherwise the operation is the same as previously described.

The invention claimed is:

1. The combination with a conveyor for movably supporting a pallet having brick thereon, of means for simultaneously aligning said pallet relative to the conveyor and said brick relative to the pallet including a slidably-mounted cross head member having a portion adapted to engage the brick and a portion adapted to engage the pallet, and power means for reciprocating said member.

2. The combination with a conveyor for movably supporting a pallet having brick thereon, of means for simultaneously aligning said pallet relative to the conveyor and said brick relative to the pallet including a slidably-mounted cross head member having a portion adapted to engage the brick and a portion adapted to engage the pallet, and unidirectional power means for reciprocating said cross head member.

3. The combination with a conveyor for movably supporting a pallet having brick thereon, of means for simultaneously aligning said pallet relative to the conveyor and said brick relative to the pallet including a slidably-mounted cross head member having a portion adapted to engage the brick and a portion adapted to engage the pallet, a crank shaft, a connecting rod connecting said crank shaft and said member, and power means for completely rotating said crank shaft to reciprocate said member.

4. The combination with a conveyor for movably supporting articles, of a pair of aligning jaws having relative movement toward and away from each other, a crank shaft for each of said jaws, a connecting rod connecting each of said crank shafts with its corresponding jaw, a pair of mating gears connecting said crank shafts, and power means for rotating one of said crank shafts.

5. The combination with a conveyor adapted to movably support a pallet having brick thereon, of an overhead frame, a pair of jaws slidably carried by said frame and having portions adapted to engage said pallet and other portions adapted to engage said brick, and power means for simultaneously reciprocating both jaws.

6. The combination with a conveyor, of a trigger adapted to be actuated by an article carried on said conveyor, means for stopping said article in position to actuate said trigger, and means responsive to the actuation of said trigger for repositioning said article upon the conveyor while stopped.

7. The combination with a conveyor, of an electrically operated stopping device for stopping the travel of articles carried thereon, an electric switch operable upon the approach of an article to actuate said electrical stopping means, a second electric switch actuatable by the article when stopped, and power means responsive to the actuation of said last-mentioned switch for repositioning the article upon said conveyor.

8. The combination with a conveyor, of an article-stopping device adapted to stop an article carried thereon, means for repositioning the article when so stopped, an electric switch member actuatable by said article when so stopped, and a second article-stopping device responsive to said switch to stop a succeeding article.

9. The combination of a conveyor, means for stopping an article carried by said conveyor, means for operating upon said article when so stopped, a second conveyor adapted to receive articles from said first conveyor, and means for releasing said article-stopping means in timed relation with the travel of said second conveyor.

10. The combination of a conveyor, means for stopping the travel of an article carried thereby, power-operated means for repositioning the article with respect to the conveyor when so stopped, an electric switch operable by the article when so stopped, a second electric switch operable in timed relation to the travel of said conveyor, and a motor control actuatable upon the operation of both of said switches to initiate the operation of said power means.

11. The combination of a conveyor, a second conveyor having attachments thereon and adapted to receive articles from said first-mentioned conveyor, means associated with said first-mentioned conveyor for stopping the travel of an article thereon, repositioning said article and releasing the same in proper timed relation with the travel of said second-mentioned conveyor to reach said second conveyor in a predetermined position with respect to said attachments.

12. The combination of a conveyor, means for stopping the travel of an article carried thereon, electrically-driven means for repositioning the article with respect to the conveyor when so stopped, an electric switch operable by the said article when so stopped to initiate the actuation of said electrically-driven means, and a second electric switch actuatable by the said article to prevent successive actuation of the said electrically-driven means by the same article.

In witness whereof, we have hereunto affixed our signatures.

GRAFTON E. LUCE.
THOMAS B. HUESTIS.